Feb. 5, 1929.
D. J. SHELTON
1,701,016
STEERING MECHANISM FOR POWER SHOVELS
Filed Nov. 20, 1926   4 Sheets-Sheet 4
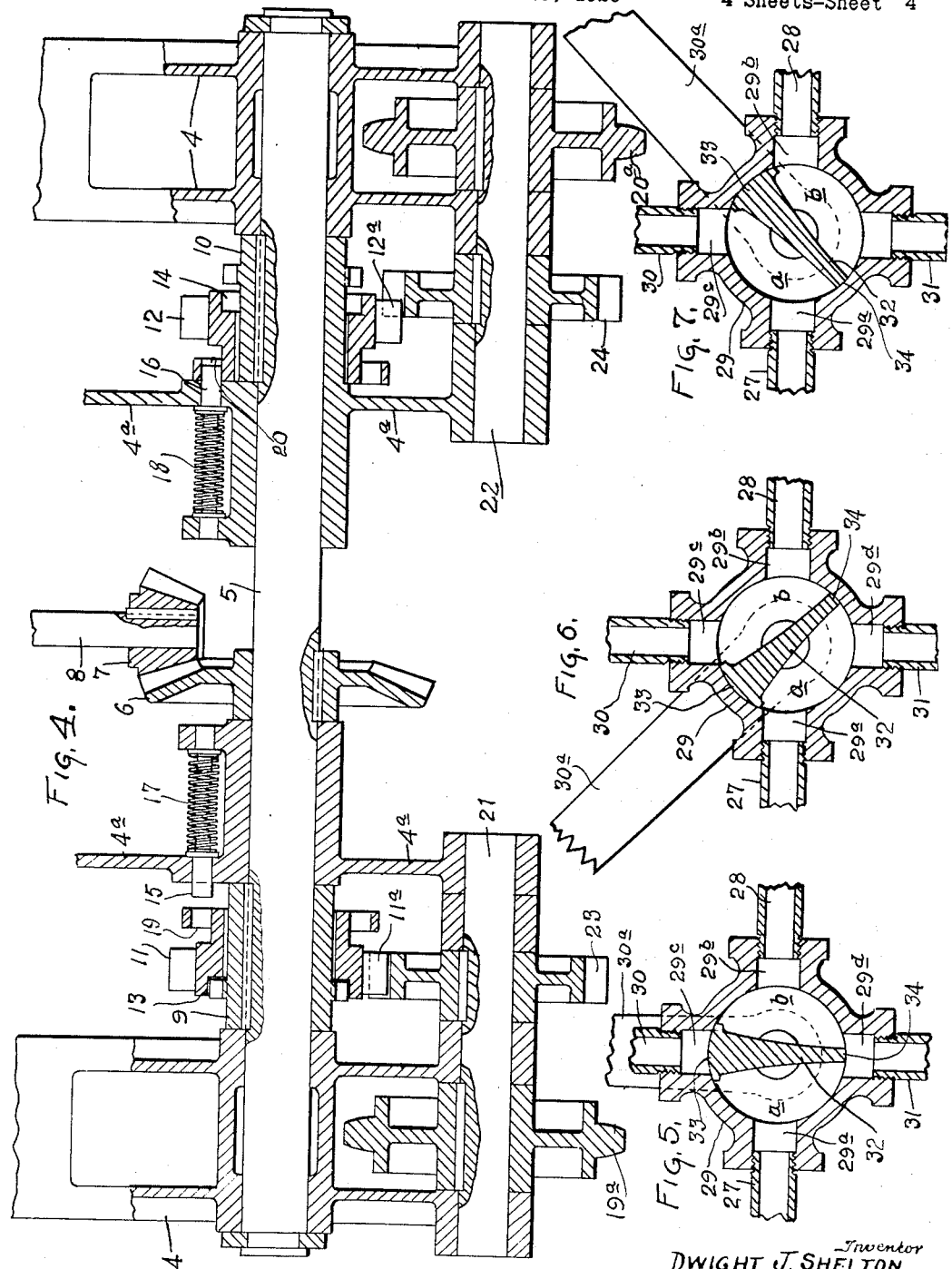
Inventor
DWIGHT J. SHELTON, Patented Feb. 5, 1929.

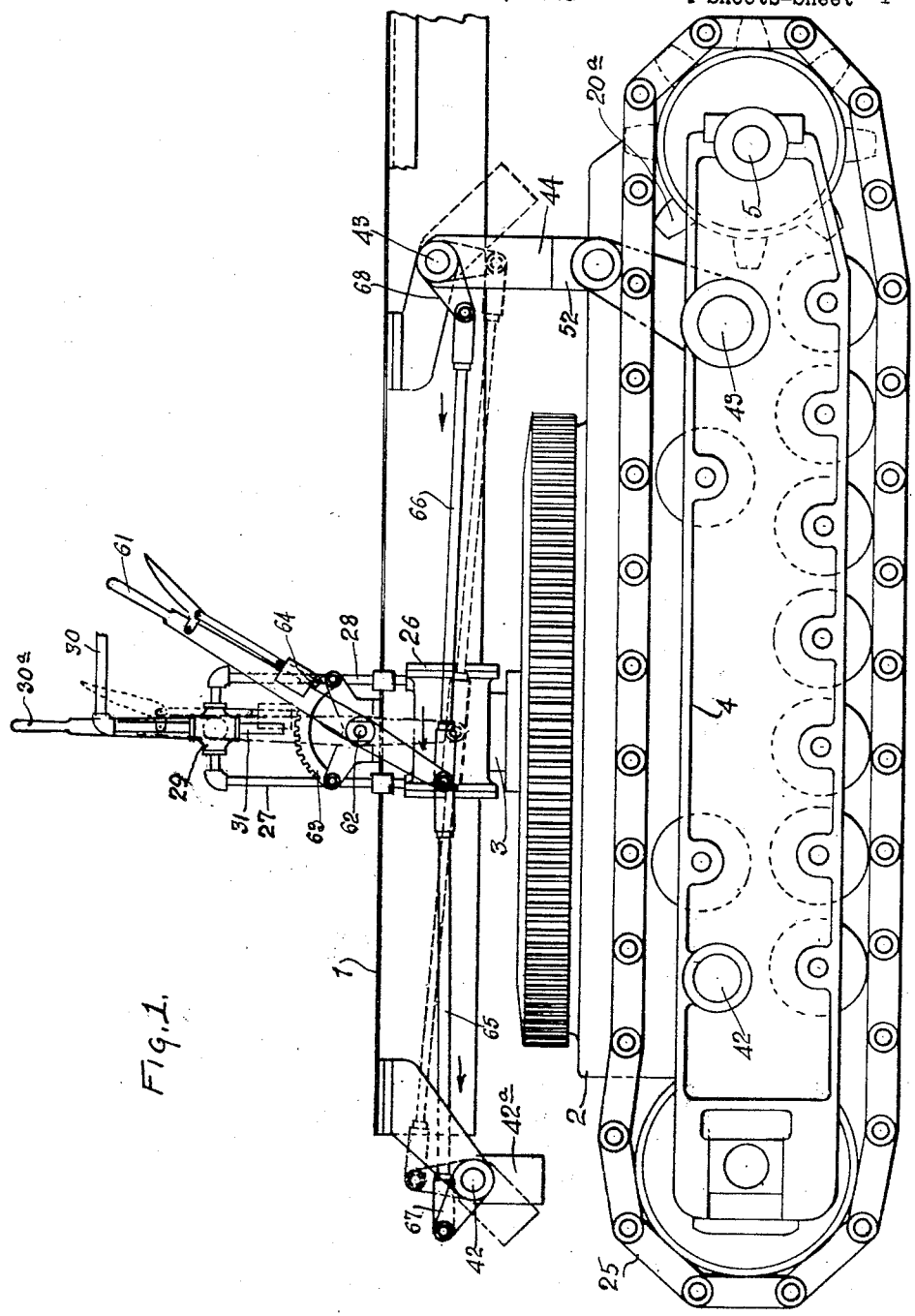

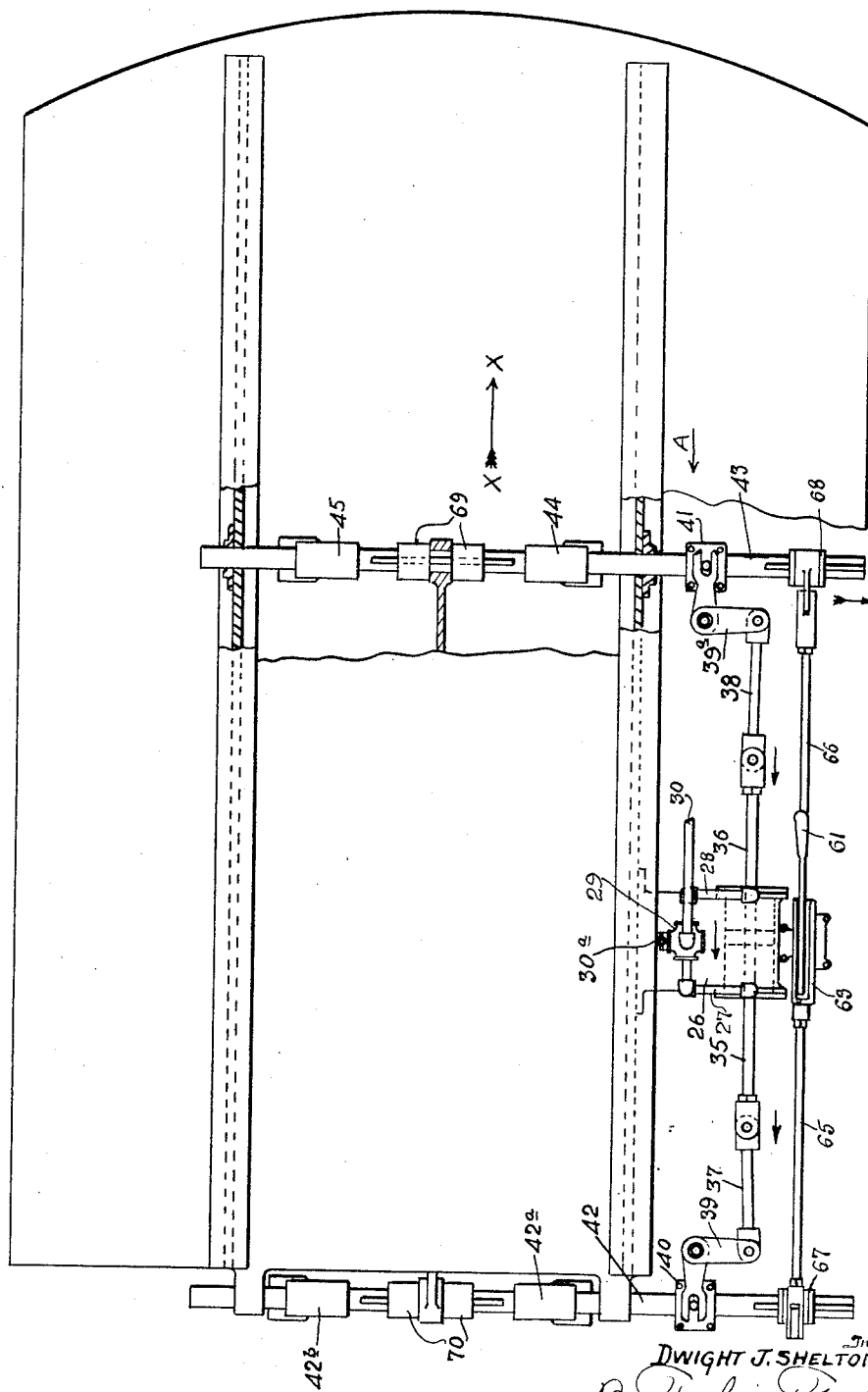

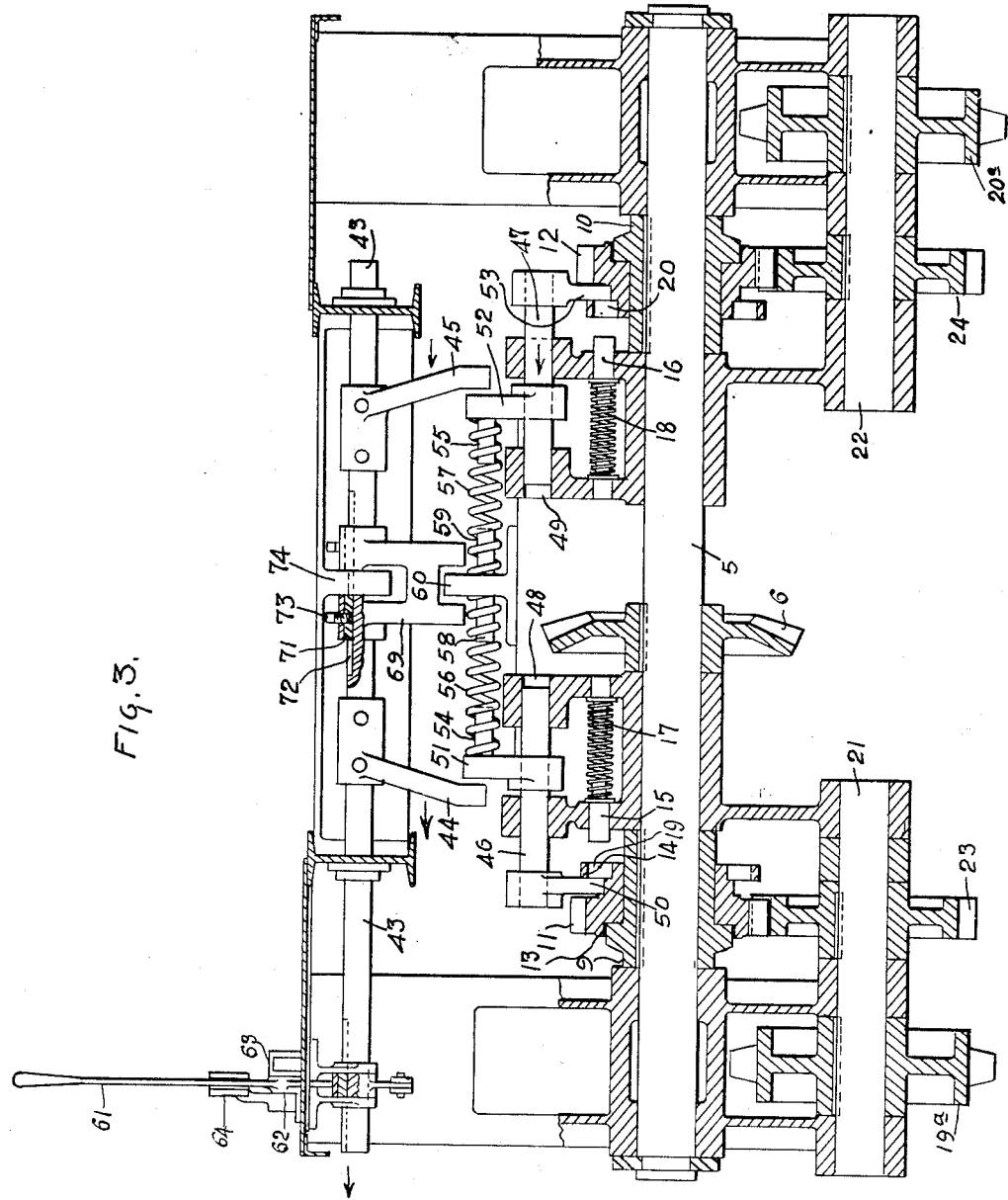

1,701,016

UNITED STATES PATENT OFFICE.

DWIGHT J. SHELTON, OF MARION, OHIO, ASSIGNOR TO THE MARION STEAM SHOVEL COMPANY, OF MARION, OHIO, A CORPORATION OF OHIO.

STEERING MECHANISM FOR POWER SHOVELS.

Application filed November 20, 1926. Serial No. 149,616.

This invention relates to steering mechanism for power shovels of the so-called "creeping belt" type, meaning such shovels as are mounted on endless traction-belts.

The present invention is in the nature of an improvement on the invention set forth in the application of myself and Charles A. Weber, filed in the United States Patent Office August 5, 1926, and bearing Serial No. 127,310 for improvements in steering devices for revolving shovels.

In that application the motor or engine employed to operate or actuate the steering mechanism acts through the intermediary of a mechanical arrangement in the nature of a crank arm and yoke, links and bell crank levers as constituting the actuating branch of the mechanism as distinguished from the actuated branch of it.

My present invention consists, essentially, of a steering mechanism comprising three branches, namely, an actuating branch, a positioning branch, and an actuated branch; the actuating branch being adapted to be positioned by the positioning branch with respect to the actuated branch in such wise as that a movement of the actuating branch in one direction will cause the propelling mechanism at one side of the machine to become locked against movement while permitting the propelling mechanism at the other side to continue in motion to effect a turning movement or line of travel of the machine as a whole; while a neutral or inactive position of the actuating branch will allow the propelling mechanism at both sides of the machine to be put in motion for the forward or backward essentially straight-line travel of the machine; these propelling features being parts of the actuated branch of my improvements.

Such are the principal features of the organization of my present steering mechanism, all of which will be more fully hereafter described.

In the accompanying drawings forming a part of this specification and on which like reference characters designate corresponding parts, Fig. 1 is a side elevation of my steering mechanism and so much of a power shovel as is necessary to show its application;

Fig. 2 is a plan view of what is shown in side elevation in Fig. 1;

Fig. 3 is a partial end elevation of the swinging platform and the connected steering devices and a transverse sectional view of other parts of the steering mechanism and the truck frame with its traction-belt sprocket wheels; showing the parts in position when the machine is being steered straight ahead, the view being taken in the direction of the arrow A on Fig. 2;

Fig. 4 is an enlarged transverse sectional view of the traction mechanism when the parts are in the position required for steering the machine, say to the right-hand, as in making a right-hand turn;

Fig. 5 is an enlarged detail sectional view through the air or steam valve for admitting the pressure medium to the engine cylinder, showing the valve closed against the admission of the medium, steam or air;

Fig. 6 is a like view showing the valve open to admit the steam or air to the right-hand end of the cylinder as it apepars in Figs. 1 and 2;

Fig. 7 is a like view showing the valve open to admit the steam or air to the left-hand end of the cylinder as it appears in Figs. 1 and 2.

Referring to the drawings numeral 1 designates a part of the upper frame of which is constituted the rotatable platform of a power shovel, say steam or electrically operated. This platform is rotatably mounted on the truck frame, generally indicated by the numeral 2, in any conventional way, turning about a central trunnion as shown at 3. This platform carries that part of my steering mechanism which I classify as the actuating branch, while the actuated branch is carried by the traction truck comprising a general frame, in the nature of a large casing, one at either side of the machine, as indicated by the numerals 4 and 4ᵃ.

Each of these frames, 4 and 4ᵃ, furnishes bearings for a large transverse shaft 5, which is the traction driving shaft, being operated by a beveled gear 6 driven by beveled pinion 7 on a driving shaft 8, which latter receives motion from the transporting or propulsion engine mounted on the platform, in the usual way. On this traction shaft is secured clutch members 9 and 10 and on which are slidably mounted driving gears 11 and 12 whose hub portions constitute corresponding clutch members as indicated at 13 and 14, particularly seen in Fig. 4.

A portion of the traction frame also carries locking pins 15 and 16 actuated by coil springs 17 and 18 to cause these pins to project themselves in such a way as to enter holes 19 and 20, respectively, in the driving gears 11, and 12, when those gears are adjusted toward the pins. This is for the purpose of locking one or the other of these gears against rotation while leaving the other gear free to rotate, as required when the machine is to be driven in a curved path or to make a turn.

In Fig. 3 I have shown both driving gears 11 and 12 out of engagement with these locking pins and free to rotate with the traction shaft 5 to transmit motion to the caterpillar sprockets 19$^a$ and 20$^a$ through the intermediary of the respective shafts 21 and 22 and the gears 23 and 24 with which, respectively, the driving gears 11 and 12 mesh, as shown in Fig. 3, when the machine is being driven straight ahead or straight back; or with which one driving gear fully engages as shown at 11$^a$ in Fig. 4 while the other driving gear 12 partially engages with the driven gear 24 as shown at 12$^a$ in Fig. 4, the position of the gears when the machine is to be turned, say to the right-hand. In this position the gear 12 is in engagement with the locking pin 16 and is disengaged from the clutch member 10 so that the gear 12 may remain still and thereby lock the sprocket 20$^a$ through the gear 24 and their shaft 22, while the corresponding driving gear 11 is being rotated by the shaft 5 and in turn is rotating the sprocket 19$^a$ through the gear 23 and their shaft 21. In this way the traction belts generally indicated at 25 in Fig. 1 are held from rotation on one side and compelled to rotate or travel on the other side, so as to effect the proper steering or turning of the machine.

Having now described the general features which are in themselves no part of the present invention, I shall proceed to describe these features in themselves, and which when combined with these conventional features constitute the embodiment of the present invention.

I will refer first to that branch of my steering mechanism which I term the actuating branch and which is mounted on the platform of the machine. This branch comprises a cylinder 26 as clearly seen in Figs. 1 and 2. Inlet pipes 27 and 28 supply the motive fluid, as compressed air or steam, to the cylinder at one side or the other of its piston. These pipes carry a valve casing 29 having ports 29$^a$ and 29$^b$ for these pipes, and a port 29$^c$ for the supply pipe 30 and an exhaust port 29$^d$ for an exhaust pipe 31.

If the power shovel is one equipped with electrical apparatus as the power agent, air would be preferable as the power medium to operate the piston in the cylinder 26. If a boiler and a steam engine are used to operate the shovel then steam will be the preferred medium for actuating the piston in the cylinder 26.

The valve shell, it will be observed, has four ports and within it a valve proper indicated at 32 with a cut-off web 33 sufficiently thick at one side to close the inlet port 29$^c$, while sufficiently thin at the other extremity 34 to leave open the exhaust port 29$^d$ as shown in Fig. 5.

The passageways $a$ and $b$ through the valve proper which are at either side of the web are such that when the valve is positioned in the normal and cut off the supply of pressure medium to the cylinder the exhaust port 29$^d$ and the supply ports 29$^a$ and 29$^b$ are open, so that any air or steam in the cylinder may exhaust.

These passageways $a$ and $b$ also form communication between the supply pipe 30 and the feed pipe 28, while keeping open the communication between the exhaust pipe 31 and the feed pipe 27 when the valve proper is in the position shown in Fig. 6. In that position the medium is being fed into the right-hand end of the cylinder as viewed in Figs. 1 and 2.

And when the valve proper is in the position shown in Figs. 7 then the supply pipe and the feed pipe 27 are in communication while the supply pipe 28 is in communication with the exhaust pipe 31, in which case the power medium is being fed into the left-hand end of the cylinder, as viewed in Figs. 1 and 2.

It will now be understood that when the operator desires to actuate the engine piston rods 35 and 36 he will open the valve say by turning the plug from the position shown in Fig. 5 to that shown in Fig. 6, which will move the piston rods in the direction of the arrow as seen in Figs. 1 and 2, in which case the steam or air will enter the right-hand end of the cylinder 26.

This movement of the pistons will operate the pitmen 37 and 38 through which the respective bell crank levers 39 and 39$^a$ are operated. These levers connect with collars 40 and 41, respectively, to longitudinally move the major actuating shafts 42 and 43, respectively, so that the one of these two shafts which may happen to be over the actuated branch of the steering mechanism carried by the traction truck, according to the then position of the swinging platform of the machine, will actuate through one or the other of its rigid actuator arms 44 or 45.

The other branch of the mechanism is seen in Fig. 3 and which mechanism will presently be described.

If, for instance, the swinging platform is in the position shown in Figs. 1 and 2 when the major actuating shafts 42 and 43 are longitudinally moved, then the shaft 43 will act through its actuator arm 45 to actuate the lower branch of the mechanism; and the other actuator arm 44 will simply move idly away without functioning at that time. In connection with these remarks see Fig. 3.

If on the other hand the platform happens to be turned end for end from the position shown in Figs. 1 and 2, then the major actuating shaft 42 will actuate the lower branch of the mechanism through one or the other of its actuator arms 42$^a$ or 42$^b$, according to in which direction the engine piston is moved.

This actuated mechanism comprises two slidable shafts 46 and 47 mounted in bearings 48 and 49, respectively, and each equipped with two extended lugs 50 and 51 on shaft 46 and 52 and 53 on shaft 47. The lug 50 extends into an annular groove in the gear 11 to shift that gear laterally so as to lock it on the pin 15 or unlock it as the case may be. The lug 53 likewise extends into an annular groove in the gear 12 for the same purpose.

In order to shift the shafts 46 and 47 respectively, so that their lugs 50 and 53 will perform the function above stated, the lugs 51 and 52 are provided and adapted to be moved laterally and respectively by the actuator arms 44 and 45 carried by the major actuating shaft 43; or to be similarly operated by the actuator arms 42$^a$ and 42$^b$ when the major actuating shaft 42 happens to be positioned in line with these extended lugs 51 and 52, as when the platform has been swung around 180 degrees.

Each lug 51 and 52 has a projecting stud 54 and 55 respectively, on each of which is mounted one end of coil springs 56 and 57 respectively, the other ends of these springs being likewise mounted on projections 58 and 59 carried by a central standard 60 formed on a convenient part of the caterpillar frame.

These springs 56 and 57 perform two important functions. First, they by their expansion keep the gears 11 and 12 normally in mesh with the driven pinions 23 and 24 respectively; and secondly after they have been compressed by an inward movement of the lugs 51 and 52 respectively, they function to return the actuator arm 44 or 45 as the case may be, to its normal position and in doing so these springs in effect move the major actuating shaft 42 or 43 back to normal position and therefore return the piston in the cylinder 26 to its normal or central position. Thus this piston is given its return stroke from either end of the cylinder back to its central or normal position by the action of one or the other of these springs 56 and 57 acting through the intermediate parts including the bell crank levers 39 or 39$^a$ and the connecting pitmen 37 and 38.

There now remains to be mentioned what may be regarded as the third branch of the mechanism, treating the actuating mechanism carried by the platform as one branch, the actuated mehcanism carried by the traction frame, as just described, as the second branch and the devices now to be described for positioning the actuator arms of the first branch from their normal position out of line with the extended lugs 51 and 52 to their actuating position in line with these lugs, as the third branch.

This third branch comprises a lever 61, best seen in Figs. 1 and 3 fulcrum at 62 on the base of a segment 63 carried on the platform 1. This lever can be locked in one position or the other, one position being shown in Fig. 1, by the hand operated detent 64 engaging the segment proper. The lower end of this lever connects with two connecting rods designated 65 and 66 respectively, which are attached at their other ends to cranks 67 and 68 respectively. These cranks are secured one to the actuating shaft 42 and the other to the actuating shaft 43. When the lever 61 is operated it rocks these shafts through these connections. A movement of the lever to the right as viewed in Fig. 1, will bring the actuator arms 44 and 45 from their dotted positions, as shown in Fig. 1, to their full line positions which latter positions place them in line with the extended lugs 51 and 52; and will likewise bring the actuator arms 42$^a$ and 42$^b$ from their dotted positions shown in Fig. 1 to the full line positions there shown but without any functional result until and unless the platform is swung in a position to bring these arms 42$^a$ and 42$^b$ in line with the extended lugs 51 and 52.

There is also carried on these shafts 42 and 43 locking arms 69 and 70 respectively, which being keyed to the shafts will be brought down with the actuator arms 44 and 45, or brought down with the actuator arms 42$^a$ and 42$^b$ according to which shaft is rocked or partially rotated.

From Fig. 3 it will be observed that the shaft 43 having been rocked the locking arm 69 has been positioned over the fixed standard 60 carried by the traction frame. The lower end of the locking arm is recessed or notched with sufficient clearance between the walls of the notch and the standard 60 to insure freedom in positioning the locking arm without striking a standard.

The function of these locking arms is that of in effect interconnecting the swinging platform with the caterpillar frame to hold the platform against any tendency to move in either direction during the time the actuator shafts 42 or 43 are being moved endwise to exert pressure through the arms 42$^a$ and 42$^b$ or arms 44 and 45, as the case may be, against the extended lugs 51 or 52.

While any form of connection of the locking arms 69 and 70 to their respective shafts may be employed, I prefer to use in addition to an ordinary key 71, which is slidable in the key seat 72 of the shaft 43, a set screw 73 to hold the key to the locking arm so that the key will not become displaced when the shaft 43, for instance, is reciprocated by the action of the steam or air in the cylinder 26. When the shaft is reciprocated locking arm 69 remains still by reason of the fact that it is held from movement by the projection 74 carried by the upper frame structure on which the platform proper is mounted, this upper frame being regarded as a part of the platform in the sense that it is the platform supporting structure.

I will now give an example of the mode of operating this invention to steer the machine straight ahead or say to the left; let it be assumed that the parts are in the position shown in Fig. 1, in which the third branch of the mechanism has been operated whereby the lever 61, the connecting rods 65 and 66 and the major actuating shafts 42 and 43 with their respective arms 42$^a$, 42$^b$ and 44, 45 and the locking arm 69 or 70 has been adjusted as seen in Fig. 1 to position this branch of the mehcanism ready to actuate the actuated branch, as seen in Fig. 3.

The operator will then manipulate the valve lever 30$^a$ from the normal or upright position shown in Fig. 5 to that shown in Fig. 6, which will open the valve for the admission of the pressure medium into the pipe line 28 and thence into the right-hand end of the cylinder 26. This will cause the piston and its connections to move the major operating shaft 42 longitudinally of itself together with its actuator arms and locking arm but without any effect, and will cause a longitudinal movement also of the major actuating shaft 43 in a direction longitudinal of itself as shown by the arrow in Figs. 2 and 3. This movement in the direction as shown by the arrow in Figs. 2 and 3 will bring the actuator arm 45 against the extended lug 52 and thereby move the shaft 47 also in the direction of the arrow shown on it and through the lug 53 will move the driving gear 12 from the position shown in Fig. 3, where all the parts are shown for a straight ahead movement, to the position shown in Fig. 4 which will lock the gear 12 on the pin 16 and partially but not wholly move the gear 12 out of mesh with the teeth of the driven gear 24. Thereby the gear 24 will also be locked and in turn the shaft 22 and the sprocket wheel 20$^a$ which will result in holding stationary the traction belt at the left side of the machine, assuming it is traveling in the direction of the arrow XX, in Fig. 2.

But the shaft 46 would be unaffected by these movements and therefore the gear 11 would remain in the position shown in Fig. 3 and likewise shown in Fig. 4, in which it is in mesh with the driven gear wheel 23 which will cause a rotation of the sprocket 19$^a$ and therefore the travel or rotation of the traction belt on the right side of the machine.

This will effect a left-hand turn of the whole machine because the traction or traction belt on the right side would be traveling forwardly while the belt on the left-hand side would be standing without rotation, which will cause the right-hand side of the machine to progress toward the left.

To turn the machine toward the right, if that had been the desire of the operator, he would have positioned the valve 29 as shown in Fig. 7 which would have admitted the pressure medium to the left-hand end of the cylinder 26 through the pipe 27, and would in consequence have actuated the bell crank levers 39 and 39$^a$ in the reverse direction to that stated above, so that while the shaft 42 and its arms would have still been inactive yet the shaft 43 would have moved longitudinally in a direction the reverse of that indicated by the arrows in Figs. 2 and 3, so that the arm 44 would have engaged the extended lug 51 and brought about the locking of the gear 11 on the pin 15 and the partial enmeshing of that gear with the gear 23 so that the gear 23 and the sprocket 19$^a$ would have been locked, while the gear 12 would have remained in the position shown in Fig. 3 and therefore unlocked and capable of rotating the gear 24 and sprocket 20$^a$ so as to make the traction belt on the left side of the machine rotate forwardly and swing that side, the left side, toward the right to make the right-hand turn.

Thus it will be understood that my steering apparatus will function to steer the machine straight ahead or to steer it to the right or the left without any rotated movement of the platform to operate the actuated or second branch of the mechanism, but while the platform is in fact locked to the traction truck by the cooperation of the locking arm 69 and the standard 60.

Thus it is also to be understood that no matter which end of the platform may be over the actuated branch of the mechanism still that these steering operations, straight ahead or to either side, may be performed, the major actuating shaft 42 and its arms, or the major actuating shaft 43 and its arms, being utilized for ordinary steering purposes interchangeably as may be most convenient according to whether the position of the platform with respect to the truck is such as to position the shaft 42 or the shaft 43 in the right place when a steering operation is to be performed.

Again, either of these actuating shafts not only may be used in the steering operation, but either of them when properly positioned with respect to this second or actuated branch of the mechanism can be used to steer straight ahead or to effect a veering or turning movement to either side.

The third branch of the mechanism, which I would term the positioning mechanism, is actuated to bring the actuator arms and the locking arm of either major actuating shaft into their operating position, an example of which is shown in Fig. 3, after one or the other of these shafts has been placed over or in proper relation to the actuated branch. So that the order of steps in the operation is, first to place the desired major operating shaft approximately over the actuated mechanism; secondly to manipulate the positioning mechanism to bring the actuator and locking arms in their functioning position; and thirdly to then manipulate the valve and admit the pressure medium to the cylinder to cause the actuator arms to lock one driving gear (11 or 12) and allow the other to remain unlocked, so as to steer to the right or to the left; while by not charging the cylinder with the pressure medium the parts will remain in the positions shown in Fig. 3 and the machine will move straight ahead or straight rearward. This steering operation applies also whether the machine is to be propelled forwardly or rearwardly.

It will be understood that I desire to comprehend within my invention such modifications as may be necessary to adapt it to varying conditions and uses.

Having thus fully described my invention, what I claim as new and desire to secure by Letters Patent, is:

1. In a power shovel, the combination with the platform and the propulsion mechanism to support and give mobility to the machine, of steering mechanism comprising an actuating branch composed of a motor and a major actuating-shaft having actuator arms normally in inactive position, a positioning branch comprising a lever and connections between it and the actuating shaft adapted to position the actuator arms from inactive to active position, and an actuated branch comprising slidable shafts adapted to be actuated by said actuator arms, and driving gears controlled by said shafts and adapted to be thrown in and out of mesh with the propulsion mechanism of the machine.

2. In a power shovel, the combination with the platform and the propulsion mechanism to support and give mobility to the machine, of steering mechanism comprising an actuating branch and an actuated branch, the actuating branch being composed of major longitudinally movable actuating shafts mounted on the platform, a motor having its piston connected with said shafts to move them longitudinally, and actuator arms secured to said shafts in normally inactive positions, a positioning branch operatively associated with the actuating branch and comprising a lever, connecting rods and cranks by which said shafts are rocked to position the actuator arms in active relation to the actuated branch, the said actuated branch comprising slidable shafts adapted to be actuated by said arms, and driving gears movable by said sliding shafts into and out of mesh with the propulsion mechanism of the machine.

3. In a power shovel, the combination with the platform and the propulsion mechanism to support and give mobility to the machine, of steering mechanism comprising an actuating branch composed of major longitudinally adjustable actuating shafts mounted on the platform at opposite sides of the platform center and each having actuator arms, an engine operable by a pressure medium, and bell crank connections between the engine piston and said shafts to adjust them longitudinally, a positioning branch operatively associated with the actuating branch and comprising a hand lever, connecting rods and crank arms, the crank arms serving as actuator arms by which to rock said actuating shafts to move said arms from inactive to active position, and an actuated branch comprising slidable shafts spring-held in normal position and adapted to be moved longitudinally by said actuator arms, a master driving shaft, slidable driving gears mounted thereon adapted to be alternately locked by the said adjustable shafts against rotation and clutched to the latter shaft for rotation, and driven gears of the propulsion mechanism locked by said driving gears or driven by them according to the position of the driving gears.

4. In a power shovel, the combination with the platform and the propulsion mechanism to support and give mobility to the machine, of propulsion mechanism comprising driven gears and of steering mechanism comprising an actuating branch composed of two major longitudinally adjustable actuating shafts mounted on the platform at opposite sides of the center, actuator arms secured to said shafts, an engine adapted to be operated by a pressure medium, bell crank levers operable by the engine piston to adjust said shafts longitudinally, a positioning branch operatively associated with the actuating branch, the said positioning branch comprising a hand lever, connecting rods and crank arms to position the actuator arms from inactive to active position, and an actuated branch comprising two slidable shafts each spring-held in normal position, and each operable by one of said actuator arms when the shaft of the arm is longitudinally moved, a locking device associated with each slidable shaft, a major driving shaft, two driving gears clutched thereto and operable by the sliding shafts, respectively, from clutched position into connection with the locking devices, and adapted to be thrown into and out of mesh with the driven gears of the propulsion mechanism.

5. In a power shovel, the combination with the platform and the propulsion mechanism to support and give mobility to the machine, of steering mechanism comprising an actuating branch composed of two major longitudinally operable actuating shafts mounted on the platform at opposite sides of the center, a plurality of actuator arms secured to each shaft, an engine on the platform operable by a pressure medium, pitmen and bell crank levers operable by the engine piston, each actuating shaft being longitudinally operable by one of the bell crank levers, a positioning branch comprising a hand lever mounted on the platform, connecting rods operable by the lever, and crank, arms, on the actuating shafts attached to the connecting arms and an actuated branch comprising two slidable shafts both spring-held in normal position, a driving gear slidable by each shaft, locking devices holding either shaft wholly in mesh with the driven gear or partly in mesh and in engagement with the said locking devices, and a locking instrumentality adapted to lock and unlock the platform and the traction frame together.

6. In a power shovel, the combination with the platform and the propulsion mechanism, to support and give mobility to the machine, of steering mechanism comprising an actuating branch composed of two major longitudinally operable actuating shafts mounted on the platform at opposite sides of the center, a plurality of actuator arms secured to each shaft, an engine cylinder mounted on the platform, pressure medium pipes and a valve therefor adapted to open one cylinder port to the medium and the other cylinder port to exhaust, a piston in the cylinder operative between the ports, connections between such piston and said shafts to operate the shafts longitudinally, and actuator arms carried by said shafts, a positioning branch comprising a lever and connections between it and said shafts to rock them to place the actuator arms in operative position, and an actuated branch comprising slidable shafts operable, respectively, by one or the other of said actuator arms, locking devices, slidable driving gears controlled by the slidable shafts and adapted thereby to be meshed with driven gears of the propulsion mechanism, or to be unmeshed, or one driving gear to be partially meshed and at the same time engaged with the locking device, while the other driving gear remains in mesh with its associated driven gear.

7. In a power shovel, the combination with the platform and the propulsion mechanism to support and give mobility to the machine, of a fluid operated steering mechanism comprising an actuating branch, a positioning branch, and an actuated branch, the first and second branches being carried by the platform and the third branch built into the propulsion mechanism, and a locking instrumentality operable to interlock the platform and the propulsion structure against relative rotation when the actuating branch is positioned to actuate the actuated branch.

8. In a power shovel, the combination with the platform and the propulsion mechanism to support and give mobility to the machine, of steering mechanism comprising an actuating branch composed of a motor and a major actuating-shaft having actuator arms and a locking arm normally in inactive position, a positioning branch comprising a lever and connections between it and the actuating shaft adapted to position the actuator arms from inactive to active position, and the locking arm from non-locking to locking position to interlock with the propulsion frame, and an actuated branch comprising slidable shafts adapted to be actuated by said actuator arms and driving gears controlled by said shafts and adapted to be thrown in and out of mesh with the propulsion mechanism of the machine.

9. In a power shovel, the combination with the platform, of an actuating branch of the steering mechanism comprising a plurality of longitudinally operable actuating shafts mounted on the platform, actuator arms and locking arms carried by said shafts, a motor and connections between it and the shafts to operate them longitudinally, and a positioning branch comprising a lever and connections between it and said shafts to cause the shaft to place the actuator arms in active position and the locking arms in locking position.

10. In a power shovel, the combination with the platform, of an actuating branch and steering mechanism comprising two longitudinally movable actuating shafts mounted on the platform, each shaft having a plurality of fixed actuator arms and each a locking arm, an engine operable by a pressure medium, connections between the engine piston and said shafts to longitudinally move the shafts to cause the one or the other with one of its arms to actuate, and a positioning branch comprising a hand lever mounted on the platform and having connection with said shafts to rock them to position their actuator arms in active position and to place their locking arms in locking position.

11. In a power shovel, the combination with the platform, of an actuating branch comprising a plurality of longitudinally movable actuating shafts carried by the platform, two actuator arms secured to each shaft and a locking arm also carried by each shaft and rotatably and slidably mounted thereon, an engine operable by a pressure medium and mounted on the platform, pitmen connected to the engine piston, bell crank levers connected to said shafts, whereby the shafts are longitudinally moved, and a positioning branch operatively associated with the actuating branch, the positioning branch comprising a lever pivoted on the platform, connecting rods attached to the lever, and crank arms attached to them and the shafts, to operate or rock said shafts.

12. In a power shovel, the combination with a propulsion mechanism frame, of slidable shafts mounted therein, a spring for each shaft to hold it in, and return it to, normal position, and driving gears operable each by one of these shafts to position such gears in meshed relation with other gears, or to position one such driving gear partially in mesh with one of such other gears and at the same time in locked position, and devices to then lock this driving gear.

13. In a power shovel, the combination with the frame of the propulsion mechanism, of a driving shaft mounted in such frame, two driving gears mounted on said shaft and adapted in one position to clutch thereto and at the same time mesh with gears to be driven, and either of them adapted to be unclutched and be locked while remaining partially in engagement with the gear to be driven thereby, these positionings of the driving gears being independent one of the other so that one of them will remain meshed with the gear it is to drive while the other is positioned to unclutch and be locked, a device to so position these driving gears consisting of a slidable shaft for each gear, an arm on each shaft engaging its gear and another arm on each shaft, and a spring for each other arm, whereby the driving gears may be positioned as aforesaid.

14. In a power shovel, the combination with the platform and the propulsion mechanism to support and give mobility to the machine, of steering mechanism comprising an actuating branch, a positioning branch, and an actuated branch including a spring element which reacts against the actuating branch to give it a return movement after each actuation; the first and second branches being carried by the platform and the third branch being built into the propulsion mechanism.

15. In a power shovel, the combination with the platform and the propulsion mechanism to support and give mobility to the machine, of steering mechanism comprising an actuating branch, a positioning branch, and a spring element which reacts against the actuating branch to give it a return movement after each actuation; the first and second branches being carried by the platform and the third branch being built into the propulsion mechanism, and a locking instrumentality operable to interlock the platform and the propulsion structure against relative rotation when the actuating branch is functioning to actuate the actuated branch.

In testimony whereof, I affix my signature.

DWIGHT J. SHELTON.